United States Patent [19]

Sasso

[11] Patent Number: 4,510,420
[45] Date of Patent: Apr. 9, 1985

[54] SERVO ROTARY MOTOR

[75] Inventor: Bill J. Sasso, Houston, Tex.

[73] Assignee: Servo Technology Corp., Houston, Tex.

[21] Appl. No.: 577,792

[22] Filed: Feb. 7, 1984

Related U.S. Application Data

[63] Continuation of Ser. No. 215,920, Dec. 12, 1980, abandoned, which is a continuation-in-part of Ser. No. 71,949, Sep. 4, 1979, abandoned.

[51] Int. Cl.$^3$ ............................................. H02K 33/12
[52] U.S. Cl. ........................................ 318/37; 310/24
[58] Field of Search ...................... 318/37, 38; 310/24

[56] References Cited

U.S. PATENT DOCUMENTS 4,019,103  4/1977  Danis et al. ........................... 318/37
4,317,058  2/1982  Blaloch ................................... 310/24

FOREIGN PATENT DOCUMENTS 2739398  1/1977  Fed. Rep. of Germany .

Primary Examiner—Stanley J. Witkowski
Assistant Examiner—Saul M. Bergmann
Attorney, Agent, or Firm—Gunn, Lee & Jackson

[57] ABSTRACT

A modified form of apparatus is disclosed, and the preferred and illustrated embodiment thereof utilizes a pulse width modulator circuit to control the duty cycle pulses applied to coils for rotating an engine. The pulse width modulator (PWM) cooperates with an engine distributor system to generate a procession of pulses which are in turn applied to a power transistor to switch the transistor off and on in timed sequence. This applies power to coils for a magnetic engine. Moreover, two coils are included with each piston and are therefore able to be triggered at different intervals.

A modified construction is also disclosed including a pair of coils which are serially positioned but independently connected to cooperate with a sleeve and piston telescoped therein and suitable passages for cooling water are also included.

6 Claims, 6 Drawing Figures

SERVO ROTARY MOTOR

This application is a continuation of application Ser. No. 215,920, filed Dec. 12, 1980, and now abandoned, which is itself a continuation-in-part of application Ser. No. 071,949, filed Sept. 4, 1979, and now abandoned.

BACKGROUND OF THE DISCLOSURE

This disclosure is directed to an electrically powered automotive engine. The improved apparatus disclosed herein enhances that previous disclosure by provision of a pulse width modulator in the electric or power generating circuitry. The PWM controls the length of the pulse which is formed by it. The pulse length in part relates to or determines the total power applied to a given piston inasmuch as power is proportionate to the time integral of the pulse applied to the piston. If relatively long pulses are applied, proportionately more power is applied. The application of more power is an important factor, but it can only happen in controlled circumstances. It must be applied in a timely fashion, timely being defined as one dependent on the relative position of the piston. In other words, the power pulse that creates the magnetic field attracting the piston and thereby tending to move the piston must be timed so that the piston is not too close and not too far in distance. If the piston is too close, it is already substantially into the coil which creates the field and the instantaneous attractive force is reduced. Conversely, if the piston is too far away, the attractive force is reduced because the force is a function of the square of the distance. The piston is therefore attracted most successfully in an optimum range of positions which translate into optimum pulse width. The PWM assists in control of the heat dissipated by the coils. Inevitably, substantial current flow is involved and generates a notable heat output. While design factors can be modified to accommodate extraordinarily high temperatures, it is advantageous to avoid high temperatures by utilization of a reduced cycle. Heat that is created is proportionate to the current flow and the duty cycle of the current. While the current flow can be increased, a reduction in the duty cycle decreases the heat liberated. Accordingly, the present apparatus has one advantage: The creation of optimum torque in relation to the piston position while at the same time providing a more tolerable heat load on the apparatus. This is advantageous, particularly in light of the relatively high current levels which are required to generate a reasonable amount of torque in a converted magnetic engine.

As revealed in the parent disclosure, this apparatus is particularly adapted to be placed in a worn engine. The worn engine is salvaged by removing the pistons and the other apparatus associated with the carburation system. That material can be replaced by pistons formed of magnetic material (hereinafter referred to as plungers) and the substitution of coils in the cylinder holes. The present invention is able to convert a worn gasoline engine and extend the life of the engine block substantially. This is accomplished by placing inserts into the cylinders. A cylinder liner or sleeve is constructed and placed in the cylinder hole. It opens into the water jacket, and is supported from a replacement head. The head is markedly simplified in contrast with cylinder heads required for gasoline engines. Moreover, the cylinder head and sleeve support a coil form which is reduced in size so that water can flow around the coil, yet the coil form has sufficient size to encircle the plunger substituted for the removed engine piston.

An important advantage of the present invention is the use of two coils in each cylinder location. The two are wound on a common diameter about a spindle insert. One is located at the top end of the cylinder, and the other is located at the lower end of the cylinder when the insert is placed in the cylinder. This alters the torque that is sensed by the ferromagnetic piston as is reciprocates. The piston is attracted by magnetic forces. Attraction between two magnets, or a magnet and electromagnet, is determined by a square law relationship. This inverse square law relationship is a factor which limits coil construction. For instance, if a coil is particularly long and draws a relatively short piston into the volume of space of the coil, the attractive force drops markedly. The use of two coils which are separately energized gives marked advantage in the torque which is created. There is less stalling, stalling being the tendency of a piston to experience markedly reduced force acting on it after it enters near the centerpoint of the volume of space enclosed by the coil. Stalling is reduced through the time switching of the multiple coils chosen for this disclosure. While measurements are not readily obtained, it is submitted that this kind of positioning of smaller coils which are also relatively short in stature materially improves the torque obtained for a given rate of power consumption. The torque acting on the piston is increased by four-fold in theory.

Since more coils are used than is ordinarily the case, the pulse length can be modified. Pulse length modification is relatively easy for low current pulses. It's a far more difficult thing to accomplish with large current pulses, perhaps in the range of 50–100 amperes. This disclosure is directed to an equipment which provides pulses of the proper length to obtain torque for multiple coils acting on a single piston. The several coils are provided with timed or sequenced pulses which obtain high torque peaks (integrated by the flywheel) at a reasonable power consumption rate.

In light of the enhanced torque for a given current flow to the converted engine, and in further light of the modified head arrangement, the present disclosure has the advantage of a water cooled system for the coils. The coils are cooled to prevent continual resistance increase.

Pulse width modulation is thus incorporated in the present apparatus and has the advantage of cutting down on the time integral of the current flow in the coil and thereby reduces liberated heat.

DESCRIPTION OF THE PREFERRED EMBODIMENT

Figure 1:
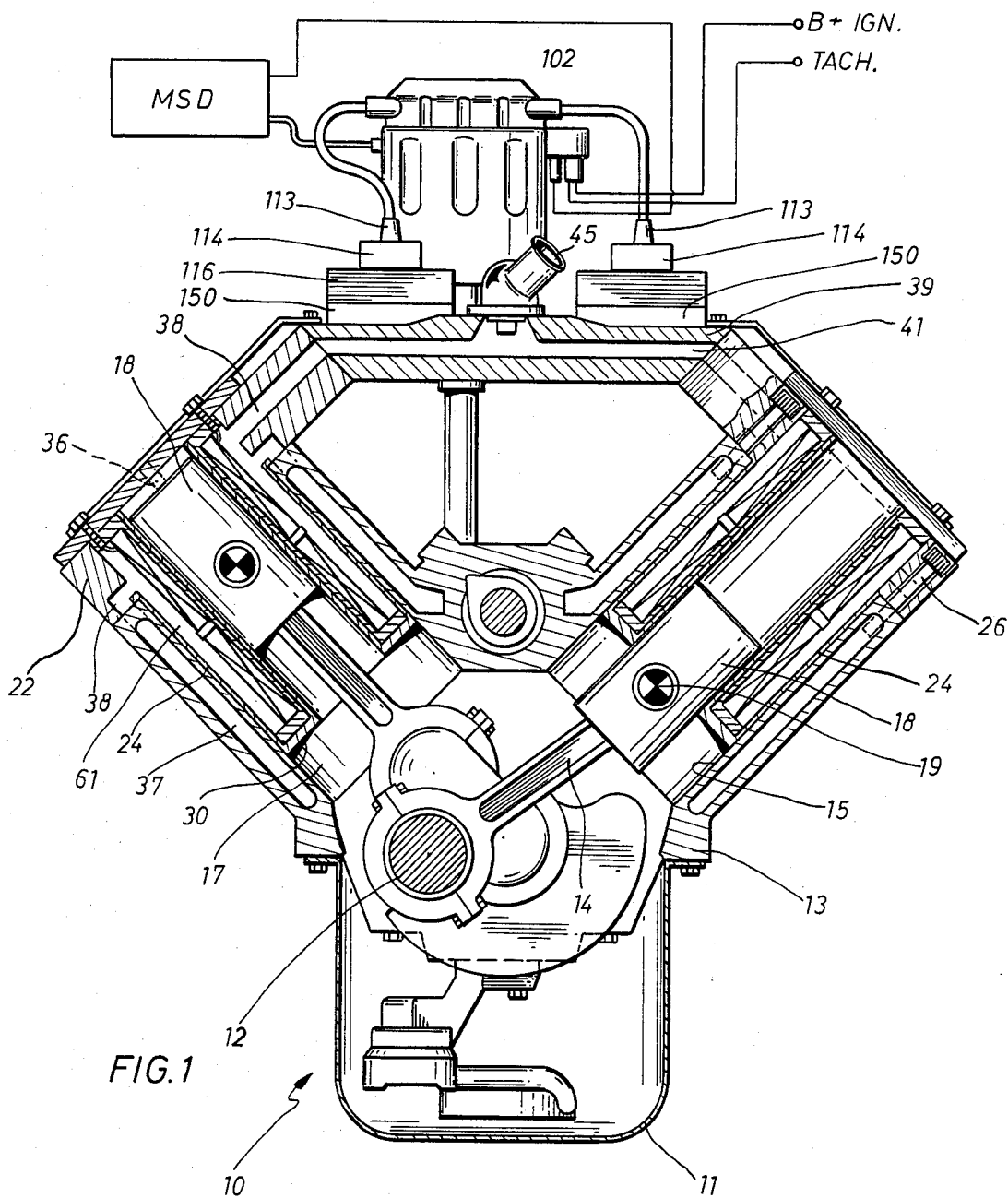
FIG. 1 is a sectional view through a V-8 engine showing modifications in accordance with the teachings of the present invention wherein coils are placed in the engine for magnetically powering the reciprocating pistons.

Attention is first directed to FIG. 1 of the drawings where a modified engine block is shown and identified by the numeral 10. The engine block is of conventional or typical construction, ordinary V-8 in form, and has been modified. A goodly portion of the engine remains unmodified, but the modified part includes the removal of the lifters, the push rods, fuel pump, carburation system and heads. It will be recognized that this is substantially the entire fuel handling system. Removal also clears the top side of the engine for mounting equipment, to be described. As the engine is modified by stripping it down, access is gained to the interior of the engine block. Removal of the heads yields access to the pistons which are also removed. While the pistons run snugly in the cylinder holes, this being necessary to maintain proper compression in the cylinder, the opening is used to receive a modified cast head with supporting sleeve. As will be described in detail, the sleeve supports first and second coils carried on a coil spindle insert.

In FIG. 1 of the drawings, the old or preexistent equipment will be first described. Then, the present invention will be described and will rely on the older equipment as a means of support structure. The numeral 11 identifies an oil pan. A crank shaft 12 rotates in the lower parts of the engine and is lubricated by oil pumped by a pump drawing oil from the oil sump. The oil pan is attached to the engine block 13 which surrounds the upper portions of the oil pan, thereby defining a closed lubricating system which at least lubricates the crank shaft, bearings, piston rods and other parts not critical to this disclosure. The numeral 14 identifies a piston rod connected in typical manner to the crank shaft 12. The piston rod 14 extends upwardly into a typical cylinder 15. The piston rod 14 has a length sufficient to enable it to support a piston in the cylinder. The piston has been removed and discarded. In its place, the present invention contemplates the use of a plunger 18. The plunger 18 is mounted to the piston rod in the same manner as a piston, namely, through the use of a wrist pin 19. The wrist pin 19 is similar in other regards, except that it need not be as long. It will be observed that the plunger 18 is smaller in diameter, defining an open annular space 17 about the plunger 18 within the cylinder 15.

Figure 2:
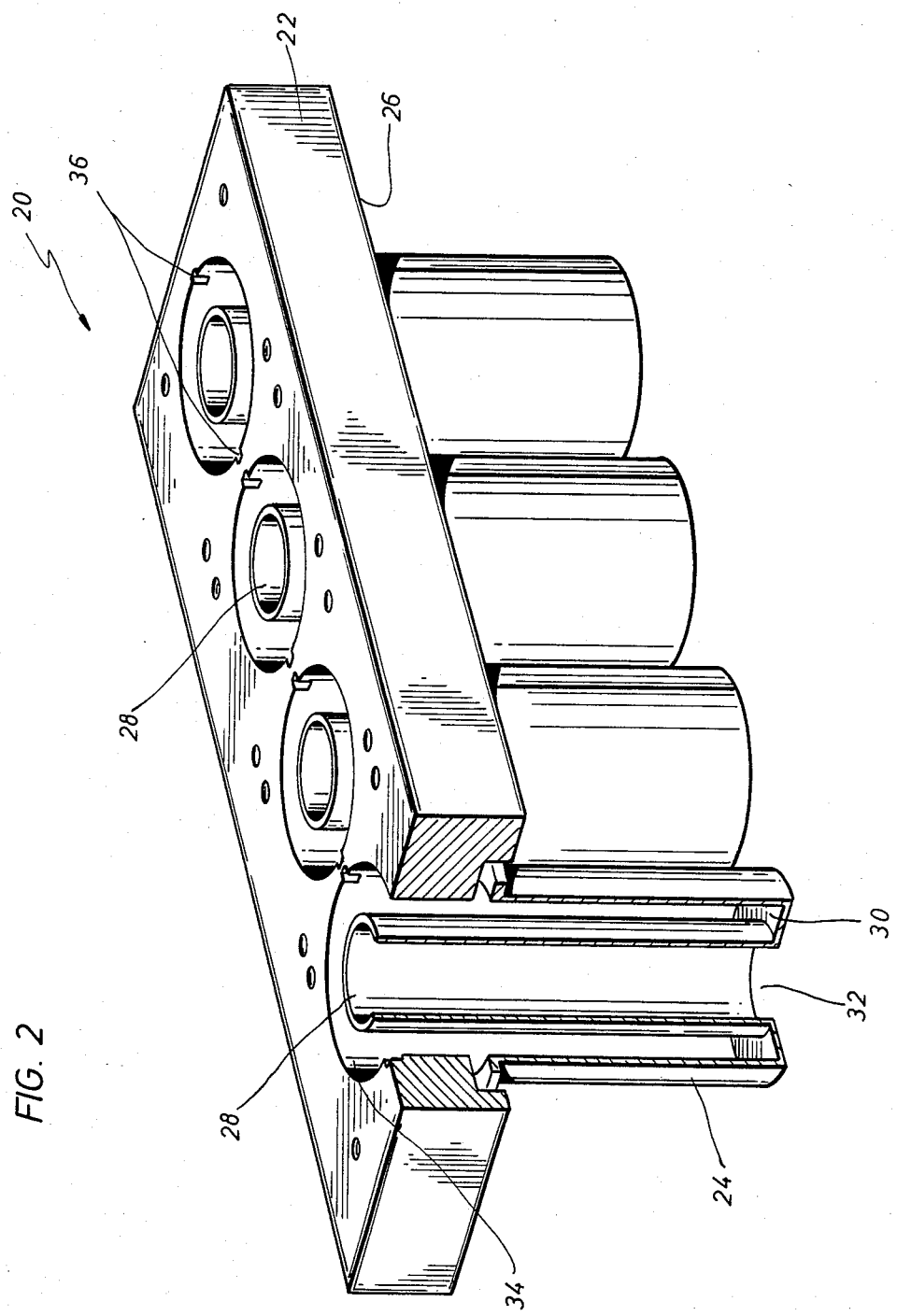
FIG. 2 is a perspective view of the modified cylinder head of the invention.

The open space 17 which surrounds the plunger 18 is used to receive the modified cast head 20 shown in FIG. 2. The head 20 is a cast iron block 22 having a generally rectangular shape as shown. The modified head 20 is the replacement for the head removed from the conventional engine block. Thus, the size and shape of the head 20 will vary according to the particular dimension of the discarded conventional head. For the sake of clarity, the fluid passages extending through the head 20 are not shown in FIG. 2, but will be described in greater detail later herein.

The block 22 of the cast head 20 incorporates a number of cylindrical receptacles 24, which receptacles extend through the block 22 and project downwardly from the bottom surface 26 of the block 22. The receptacles 24 are sized to be received in the cylinders 15 of the engine block 13. The external surface of the receptacles 24 is in snug contact with the internal surface of the cylinders 15 forming a metal to metal seal therebetween. A plurality of head bolts 26 are used to secure the head 20 to the engine block. The bolts 26 extend through the head block 22 and thread into the existing threaded holes formed in the engine block 13 for securing the conventional head. The heads of the bolts 26 are flush with the top surface of the block 22 as shown so that a coil cover may be mounted over each cylinder.

A coil mounting sleeve 28 is concentrically positioned within each of the receptacles 24. The sleeve 28 is an elongate, tubular member placed in the receptacles 24 providing the support structure for the coil spindle insert to be described later herein. Preferably, the coil mounting sleeve 28 is formed of a nonferromagnetic material. As an example, stainless steel will suffice. Another suitable material would be copper or brass. The sleeve 28 is open at both ends thereof. The lower ends of the receptacles 24 are closed by a transversely extending surface 30, which surface includes a centrally located hole 32 extending therethrough. The hole 32 is enclosed by the lower open end of the sleeve 28. The sleeve 28 is welded or otherwise mounted to the transverse surface 30 about the perimeter of the hole 32. The sleeve 28 may also be cast as an integral part of the receptacles 24, if desired. It will be observed that the sleeve 28 is smaller in diameter than the receptacles 24, defining an open annular space 34 about the sleeve 28 within the receptacles 24. The annular space 34 is open at the upper end of the receptacles 24 and closed by the transverse surface 30 at the lower end thereof. A pair of alignment slots 36, described later herein, are formed in the wall of each of the receptacles 24.

Referring again to FIG. 1, the placement of the modified head 20 on the engine block 10 is shown. The downwardly projecting portions of the receptacles 24 are received in the cylinders 15 of the engine block. The head 20 is bolted to the engine block as described hereinabove. A plurality of passages 38 which align with the fluid passages 37 of the water cooling system of the engine block are incorporated in the head 20 to enable cooling water to flow in and through the cylinder head. A cooling manifold 39 is incorporated in an engine block for distributing the water from the cylinder head through the existing engine cooling system. The manifold 39 includes passages 41 extending therethrough which are in fluid communication with the passages 37 formed in the cylinder head 20 and a water outlet 45 mounted to the manifold 39. The outlet 43 is connected to the radiator of the engine in the usual and customary manner. This cooling water is an added path for cooling water flowing in the water jacket customarily constructed in the V-8 engine block. In other words, the engine block water flow path is enhanced. This enables water to flow in the near vicinity of the coils, and this maintains the coils at a regulated temperature. The coils of the invention generate some heat. The cooling water reduces spot engine temperatures.

Figure 3:
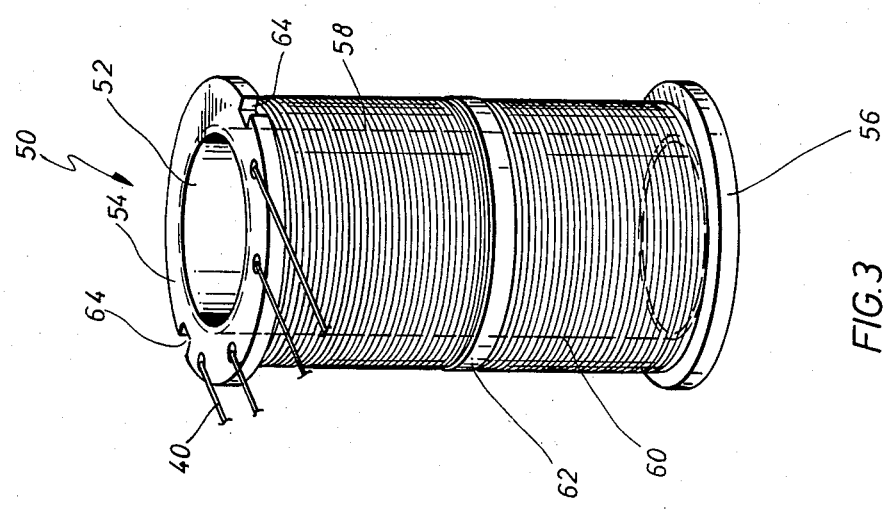
FIG. 3 is a perspective view of one of the coil inserts of the invention.

Referring now to FIG. 3, the coil spindle insert 50 is shown in greater detail. The spindle insert 50 comprises an elongate tubular member 52, the longitudinal length of which is defined by a transversely extending upper flange 54 and a transversely extending lower flange 56. The flanges 54 and 56 are spaced and parallel to each other and lie in planes perpendicular to the longitudinal axis of the spindle insert 50. The spindle insert 50 supports a pair of coils which are wound about the external surface of the tubular member 52, but are not in contact with each other. The coil 58 is the uppermost coil. The coil 60 is the lowermost coil. They are both wound to the same diameter. The coil 60 is lower, that is to say, it is positioned deeper into the engine block. By contrast, the uppermost coil 58 is positioned relatively high, and is axially aligned with the coil 60. A space 62 separates the coils. In the ordinary circumstance, the two coils have equal diameter and an equal number of turns. The field strength of each coil is approximately the same. Each coil is energized and de-energized separately at selected time intervals. It will be observed that a pair of slots 64 are formed in the upper flange 54. The slots 64 are provided for alignment with the slots 36 formed in the wall of the receptacles 24. When the opposed slots 36 and 64 are in alignment, a recess is formed for receiving a pin or other stop member for securing the spindle insert 50 in position and preventing relative rotation thereof.

The several coils in the engine are formed of multiple turns of relatively heavy duty copper wire, and the wire is preferably coated with insulated material to avoid shorting across turns. After fabrication of the coils, they are painted with a suitable material (lacquer or rubberized paint) to prevent shorting to the water jacket and to otherwise protect and preserve the coils.

The two coils are held in position on the spindle insert 50 and the insert 50 is in turn supported about the sleeve 28 which is incorporated in the modified cast cylinder head 20. The cylinder head 20 is less complex than cylinder heads ordinarily used. For instance, there are no intake or exhaust valves. Ports in the cylinder head 20 are reduced. Moreover, the cylinder head does not have to hold high pressure at elevated temperatures typically experienced near the exhaust valve. The cylinder head 20 is secured in position by a number of bolts 26 as best shown in FIG. 1.

A spindle insert 50 which supports the coils 58 and 60 is placed in each of the receptacles 24. The lower flange 56 of each insert 50 is in sealing contact with the transverse surface 30 at the lower end of the receptacles 24. The slots 36 and 64 are aligned and a pin is placed in the recess formed thereby locking the insert 50 in position. A cover plate 27 is provided for each coil for convenient and quick inspection of a specific coil. The coil spindle insert 50 is a frangible or consumable item which may be replaced periodically. The cover plate 27 permits convenient replacement of the coil insert 50.

Referring again to FIG. 1, it will be observed that the range of reciprocation for the plunger 18 within the sleeve 28 is determined by the throw of the crank shaft 12. The crank shaft reciprocates the plunger 18 through a stroke of specified length. At the top end of stroke, the plunger 18 is moved to the top of the engine block. The upper parts of the cylinder would ordinarily trap air, which is avoided in this construction. The plunger 18 is somewhat loose in the sleeve 28. It is not necessary to trap air; indeed, it serves no useful purpose. To this end, air can either leak past the diameter of the plunger 18, or it can be voided to atmosphere through a breather cap (not shown in the drawings). The breather cap preferably incorporates a filtration element so that crank case fumes (markedly reduced in this apparatus) escape from the crank case through the breather cap to atmosphere. To the extent that fumes are there, they are markedly reduced and do not pose the problems found in typical internal combustion engines.

Another important modification noted in the present apparatus is reduced oil and water sealing requirements. In a conventional automobile engine, a compression ratio of perhaps 8:1 is maintained in the cylinder. This apparatus does not require compression in the cylinder. Rather, the cylinder space can be opened to atmosphere pressure. It is more convenient and desirable to include a crankcase fumes control system, and this is relatively easy to implement inasmuch as the crankcase and cylinder spaces are all maintained at reduced pressure compared with gasoline engines. In other words, they are typically maintained at atmospheric pressure. The ferromagnetic plunger 18 which is placed in the cylinders need not fit snugly to maintain a compression seal. Rather, it should fit snugly only to the extent necessary to prevent splash of lubricating oil. As will be recalled, the crankcase has the sump collecting lubricating oil which is splashed by the rotation of the crank shaft. The lubricating system may also include an oil pump in the crankcase but, whatever the arrangement, the plunger 18 which is substituted in the modified engine disclosed herein, does not have to maintain a compression quality seal and need only prevent the unintended escape of lubricating oil.

The modified engine of the present disclosure thus utilizes a typical V-8 arrangement. The modification of a V-8 engine is described for illustrative purposes only. It is understood that any multicycle type engine, including for example, inline 4, 6, 8, 12 or 16 cylinder engines, slant 3 or 6 engines, V-4 and V-6 engines and horizontally opposed engines may be modified according to the disclosure of the instant application. In the modified engine shown in FIG. 1, all eight pistons are removed and the ferromagnetic plungers 18 are substituted. The ferromagnetic plungers 18 are attracted by a magnetic force acting on them. They reciprocate in sleeves. The sleeves 28 themselves are formed of a nonmagnetic material, and stainless steel is a good example. While other materials can be selected, it is particularly important that it be nonmagnetic so that the coils 58 and 60 supported on the insert 50 about the sleeve 28 are able to form magnetic lines of flux acting on the plungers 18. The modified plunger is a ferromagnetic mass. It is structurally similar to the piston in a gasoline engine. However, it need not have quality seal rings around it. Moreover, it is formed of a mass of material responding to magnetic lines of flux. The plunger 18 is received within the sleeve 28 and reciprocates in the sleeve. Diameter and length of stroke are scale factors which approximate those normally found in gasoline engines.

The diameter of the plunger 18 will in most cases be equal to 60% of the cylinder bore size. The length of the plunger will be approximately equal to 110% of the cylinder diameter. The weight of the plunger 18 will approximately equal the weight of the replaced piston and its rings. The magnetic movement of plunger 18 within the sleeve 28 is equal to the throw or stroke of the crankshaft of the motor being modified. In no case will the crankshaft be altered, nor will its alignment to its component engine block be modified. The sleeve 28 is received within the tubular insert 50 as shown.

Figure 6:
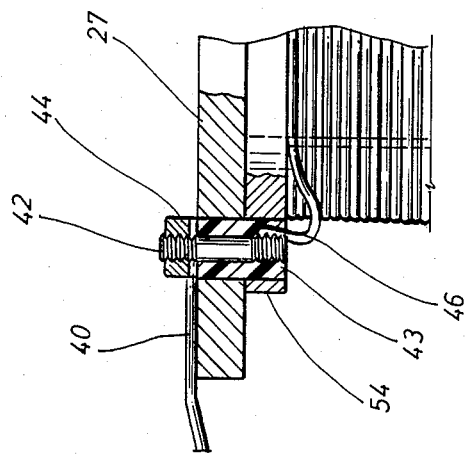
FIG. 6 is a partial sectional view showing the isolated stud screw connection of the power module cable to the coil of the invention.
Figure 4:
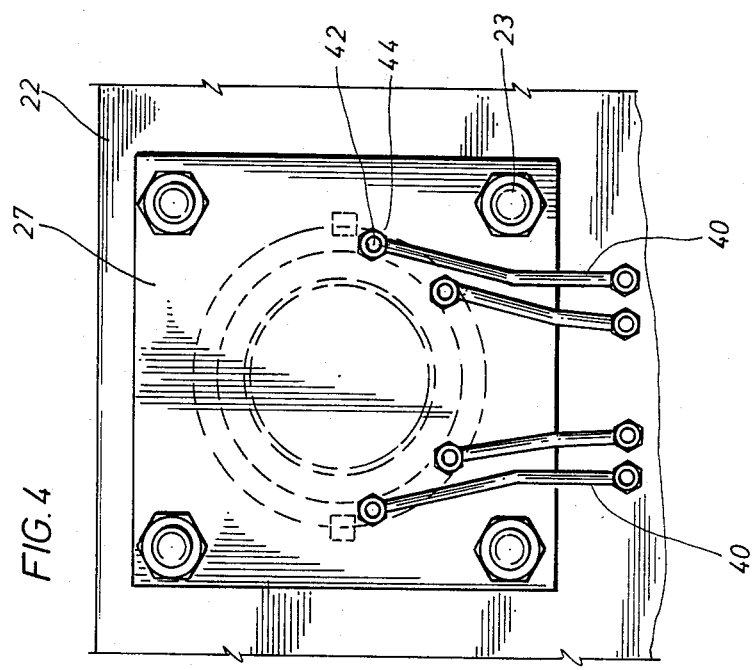
FIG. 4 is a top view of the coil inspection cover showing the connections to the power module of the invention.

The spindle insert 50 supports a pair of coils 58 and 60. Coils 58 and 60 are identical in all regards except placement. The lower coil 60 is closer to the crankshaft. The top coil 58 is remote compared to the lower coil. The two coils have remote leads 40 which are best shown in FIG. 4. In FIG. 6, a cross-sectional view of the lead connections is shown. The leads 40 connect to studs 42 as shown. Nuts 44 are employed to securely fasten the leads 40 to the studs 42. The coils 58 and 60 are connected to the leads 40 via the studs 42 at the point 46. It will further be observed that the studs 42 are isolated by sleeves 43 from contact with all metal parts.

The coils are thus operatively connected to transistorized circuitry mounted on top of the engine block as will be described hereinafter. The studs 42 extend through the cover plate 27 and are threaded to the upper flange 54 of the insert 50. The cover plate contacts the upper surface of the flange 54 of each spindle forming a metal to metal seal therebetween. Further, the cover plate 27 completely covers the insert 50 and closes off the open upper end of the annular area 34. Each cover plate 27 is securely bolted to the cylinder head 20 by a number of bolts 23.

The two coils are held in position on the spindle insert 50 and the insert 50 is in turn supported about the sleeve 28 within the receptacles 24 formed in the modified cast head 20. The coils 58 and 60 are smaller in diameter than the internal diameter of the receptacles 24, forming a space 61 therebetween and defining a water flow path about the coils 58 and 60. The fluid passages 38 formed in the head 20 open into the space 61. Thus, the water flowing through the engine cooling system completely blankets the coils 58 and 60 to maintain them at a regulated temperature.

Figure 5:
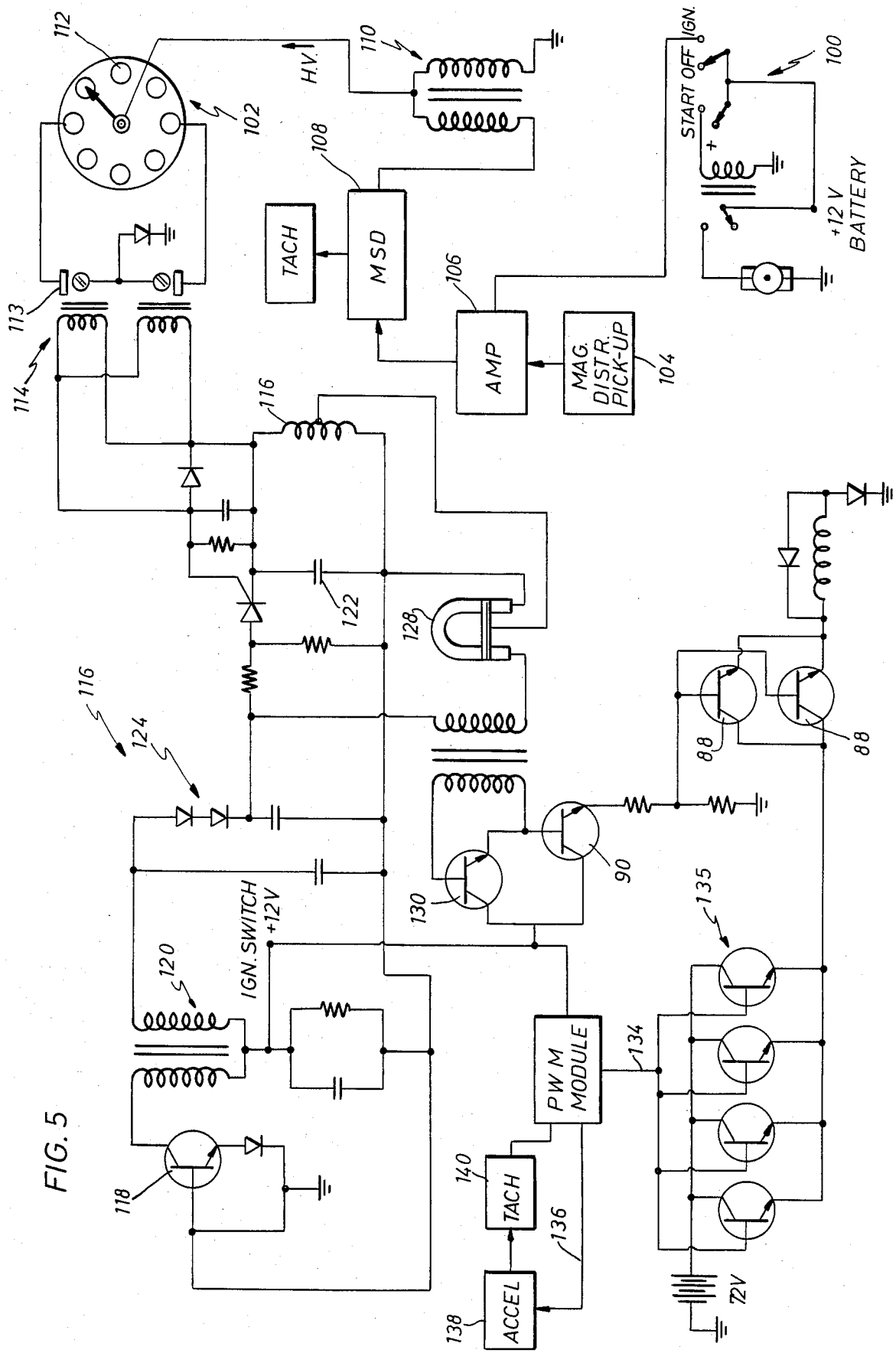
FIG. 5 is a schematic wiring diagram of a circuit for operation of the electric engine shown in FIG. 1.

The schematic circuitry of the invention is shown in FIG. 5, the modification further includes the pulse width modulator. That will be discussed later. Principally, the circuitry shown in FIG. 5 forms high current defined pulses for driving the several coils. The pulses must be timed to synchronize with the physical position of the engine. The pulses are timed to attract the reciprocating plungers. For instance, the upper coil 58 is fired first, to pull the plunger 18 toward it. When the plunger 18 travels from the bottom dead position, it is pulled up toward the upper coil 58. At a certain point in time, the plunger is drawn so deep into the coil that it approaches the stall or dead position in the coil 58. This is the position where the plunger 18 has penetrated into the center of the coil 58 and the attractive force of the upper coil does not have a vector component along the locus of the plunger. In other words, the stall position is the position at which the moving plunger 18 experiences reduced force on it.

At some point in time after the force experienced by the plunger 18 begins to drop from a maximum, the upper coil 58 is deenergized. At this juncture, it's not much help to continue applying power to the upper coil because it is unable to impart additional force to the plunger. The stall position is a question of the geometry of the plunger relative to the coil. For instance, if the upper coil 58 is 4 cm tall and the center of mass of the plunger 18 is moved to the centerpoint of the coil, a stall condition is clearly indicated. In advance of stalling, the upper coil 58 is switched off. There's no need to waste further electrical energy at this juncture. As the plunger 18 arrives at the top dead center position of its stroke, the upper coil 58 has been switched off and the plunger 18 is retracted away from its top dead center position by the continued rotation of the crankshaft. The lower coil 60 is then energized and imparts its own force to the plunger. At this juncture, assuming the lower coil is 4 cm tall, the stroke of the ferromagnetic plunger into the lower coil is powered in a very substantial fashion for at least 2 or 3 cm of stroke. As will be understood, the scale factors mentioned here are exemplary and illustrate how the second or lower coil 60 provides a timed pulse to draw the plunger toward the lower coil.

The present apparatus utilizes the circuitry shown in FIG. 5 to device time pulses with two coils. It will be understood that the example can be extended to all eight cylinders, but such an extension is not necessary to enhance understanding of this disclosure. Rather, the example provided for one plunger 18 will suffice for all eight because they function in the same manner, and they differ only in timing. It will be appreciated that in a typical V-8 engine, there are four throws for the eight cylinders. Each throw is shared by a plunger in each bank. Accordingly, when a particular throw arrives at the top dead center position, two plungers, one on each bank arrive at the top dead center, also. This indicates that that pair of plungers operates synchronistically. Accordingly, the two plungers sharing a common throw are powered simultaneously.

The flywheel for the engine stores energy so that each plunger 18 travels through a power stroke and a retraction stroke. The power stroke occurs when the plunger 18 is drawn upwardly, and it terminates when the plunger 18 reaches the top dead center. In actuality, some adjustment of a few degrees on the top dead center (TDC) position is permitted. The stroke of the plunger 18 downwardly corresponds with the power stroke in a gasoline engine when the compressed gases explode. In this instance, it is not a power stroke but rather a stroke which resets the plunger for the next power stroke. Most gasoline engines of the V-8 construction are four-cycle engines. This equipment is able to provide a one-cycle operation so that the number of power strokes is actually increased by four-fold at a given engine speed.

In typical circumstances, the engine speed measured at the crankshaft remains approximately the same as a gasoline engine. However, there are twice as many power strokes for a single revolution. In actuality, this means that four times as many strokes must be formed for every single power stroke in a comparable gasoline engine. The pulses are relatively short, down in the range of a few milliseconds. It's difficult to come up with high current pulses, and, in particular, current pulses of 50 amps or more for only milliseconds in time. To this end, FIG. 5 discloses a heavy-duty system whereby pulses of this frequency and amplitude are formed. A pulse width modulator is included. Pulse width modulator is a multivibrator circuit whose output duty cycle can be varied thereby controlling on and off time of power conducting devices. The pulse width modulator's output voltage is an average of "on times" of the pulse width modulator output cycle, whereby the amount of time of conduction through it determines the amount of voltage per cycle. A pulse width modulator (PWM) is shown in FIG. 5, and it shapes the pulse length to a desired duration. Pulse length is extremely important for switching the equipment off and on and controlling principally, the engine speed.

The power transistor modules are fired in a timed sequence determined by firing of the standard ignition system. As taught in the foregoing disclosure, the ignition system can be left intact insofar as using the spark applied to the spark plugs as a timing signal. Since that spark is applied without concern whether it successfully ignites a spark plug or not, it serves as a references signal to time operation of the circuitry shown in FIG. 5. This is accomplished by using magnetic pick ups adjacent to the spark plugs in the manner taught in the parent application. Those pulses serve as synchronization pulses. Moreover, they determine the time at which the transistor power module will provide power to respective coils pulses. The pick up coils for the spark plugs are identified at 114, and the coils thus function in the same manner previously disclosed to trigger the formation impulses for the respective cylinders.

The pulse which is formed by the PWM in FIG. 5 is actually applied to the coil by means of large heavy duty switching transistors typically arranged in parallel, one being represented at 88. In turn, transistor 88 is switched on by the driving transistor 90. The transistors 88 are, also, switched off or on by the PWM. The PWM duty cycle is slow enough (400 Hz) to synchronize with the variable duty cycle generated by the driving transistor 90. The millisecond wide pulse from 90 drives the power transistors 88 to conduction of their coils which draw up to 400 amps.

Referring now specifically to FIG. 5, the circuitry of the invention will be described in greater detail. At the lower right-hand corner of FIG. 5, a standard starting circuit is shown. An ignition switch 100 is employed to crank the engine in a conventional and well-known manner. The ignition power is distributed to a conventional distributor 102. The ignition power is first directed to that part of the distributor 102 identified by reference numeral 104, which is the magnetic distributor pick-up. The magnetic distributor pick-up 104 creates a power pulse which is amplified by the amplifier 106 and directed to the multiple spark discharge (MSD) unit 108. The MSD is commercially available and well known. The MSD 108 of the present invention has been modified to vary the duration of the spark. Every time the spark ignites, the MSD maintains the spark duration for 80° of crankshaft rotation. Stated another way, from top dead center, the crankshaft rotates 80° during the duration of the spark. The MSD output is directed to a high voltage coil 110 which is part of the standard electronic ignition system. Thus, the present invention alters the path of the ignition system's output by directing the power pulse through the MSD to make the pulse last longer. The output of the coil 110 is directed through the distributor 102 as each tab 112 on the distributor is contacted. The maximum duration of the spark in the distributor is 40°, which translates to 80° of crankshaft rotation.

The high voltage spark from the distributor 102 is directed to a spark plug 113 which functions in a conventional manner by creating a spark jumping across the gap. A magnetic pick-up coil 114 surrounds the spark plug 113. The pick-up coil 114 is connected to a sensing circuit whereby the pulse of the electromagnetic spark is measured. The sensing circuit generally identified by the reference numeral 116 functions as a multivibrator oscillator. The transistor 118 is an oscillator which drives a coil 120 and saturates a capacitor 122. The capacitor voltage is doubled by a diode network identified by the reference numeral 124 and the voltage is again doubled or tripled through a trigger coil 126. The output of the sensing circuit 116 is the Zenon tube 128. The high voltage output flashes through the Zenon tube 128 and through an isolation transformer 129 and actuates the driving transistor 130. The voltage passing through the Zenon tube 128 is in the range of 5,000 volts. When the driving transistor is actuated, it in turn actuates the predriver transistor 90. The output of the predriver transistor 90 actuates the transistors 88 which are operatively connected to the coils 58 and 60.

The predriver transistor 90 attempts to synchronize with the pulse width modulator output. The output of the PWM has a fixed voltage height, but the on-time voltage is variable due to the operator's adjustment of the accelerator. The voltage is averaged over a period of time. It will be observed that the PWM has two outputs. The line 134 connects the PWM to a series of transistors 135 which are connected in parallel. The line 136 connects the PWM to an accelerator 138 which is the control on the PWM via the tachometer 140. The tachometer 140 is the same as the one shown driven by the MSD 108. The tachometer of the present invention operates as a governing device for limiting the duration of on-time of the PWM. In this manner, the accelerator 138 controls the engine speed. The tachometer is an analog device showing the engine speed and permits a specified amount of variants through the PWM; thus, preventing the operator from burning up the power transistors.

The transistors 88 actuate the coils 58 and 60 located in the modified head 20. The coils 58 and 60 are provided with shunt diodes so that, when the power is cut off, the electromotor voltage created in the coils will be shorted across itself, preventing a voltage spike from returning to the transistors. In FIG. 1, the power transistor 88 and 135 and the PWM are generally shown in block form and identified by the reference numeral 150. The transistors are mounted to a metal base insulated by Mylar, or other similar material. The metal base is in turn securely fastened to the cooling manifold 39. The heat generated by the transistors is dissipated by the water flowing through the manifold 39, thus increasing the life of the transistors and reducing engine spot heating.

The foregoing describes the present invention as a modified, electrically powered engine from conversion of a gasoline engine. This disclosure has set forth a mechanism whereby the coils are triggered to form torque in the engine and a time sequence, achieving optimum operation of the electric engine. While the foregoing is directed to the preferred embodiment, the scope is determined by the claims.

I claim:
1. A multicylinder electromagnetic engine comprising:
   (a) an engine block including a water cooling system, a plurality of cylinders having an inner end in communication with the interior of the engine block and a crankshaft means;
   (b) an engine block head having a plurality of cylindrical receptacles projecting downwardly from a bottom surface of said head, said receptacles being closed at the lower end and open at the upper end thereof and sized to be received in said cylinders;
   (c) a magnetizable plunger reciprocally disposed in each of said receptacles, said plunger being operatively connected to said crankshaft means;
   (d) coil means disposed in each of said receptacles;
   (e) a cooling manifold in fluid communication with the water cooling system of the engine, said manifold including a plurality of fluid passages in communication with a plurality of passages formed in said engine block head providing a closed loop cooling system for cooling said coil means;
   (f) an electrical power source; and
   (g) means for selectively energizing said coil means to cause rotary motion of said crankshaft means.

2. The apparatus of claim 1 wherein said cylindrical receptacles include a transversely extending surface at the lower end thereof, said surface incorporating a centrally located hole having a diameter substantially equal to the internal diameter of an elongate tubular sleeve member mounted about said centrally located hole in each of said receptacles.

3. The apparatus of claim 2 wherein said coil means is carried on a spindle insert journaled about said sleeve member in each of said receptacles, said spindle insert comprising an elongate tubular body having an outwardly extending peripheral flange located at each end of said body, said flange at the lower end of said body being in sealing engagement with said transversely extending surface of said receptacles.

4. The apparatus of claim 3 wherein the upper end of each of said receptacles is closed by a cover plate mounted to said engine block head, said cover plate being in sealing engagement with said flange at the upper end of said spindle insert, and stud means extending through said cover plate and said flange for connecting said coil means to said electrical power source.

5. The apparatus of claim 1 wherein said energizing means includes electronic circuit means operatively connected to said coil means for sequentially switching said coil means to an on/off mode, said circuit means including a sensing circuit, a pulse width modulator and a plurality of transistors connected to said electrical power source and operating synchronistically.

6. The apparatus of claim 5 wherein said electronic circuit means is mounted on said cooling manifold and cooled thereby by water flowing through said cooling manifold.

* * * * *